United States Patent  
Kronenberg (10) Patent No.: US 10,745,963 B2  
(45) Date of Patent: Aug. 18, 2020

(54) PLUG CONNECTOR AND PLUG CONNECTION

(71) Applicant: Ralf M. Kronenberg, Haan (DE)

(72) Inventor: Ralf M. Kronenberg, Haan (DE)

( * ) Notice: Subject to any disclaimer, the term of this patent is extended or adjusted under 35 U.S.C. 154(b) by 540 days.

(21) Appl. No.: 15/527,854

(22) PCT Filed: Nov. 19, 2015

(86) PCT No.: PCT/EP2015/077048  
§ 371 (c)(1),  
(2) Date: May 18, 2017

(87) PCT Pub. No.: WO2016/079220  
PCT Pub. Date: May 26, 2016

(65) Prior Publication Data  
US 2018/0347259 A1 Dec. 6, 2018

(30) Foreign Application Priority Data  
Nov. 19, 2014 (DE) .................... 20 2014 105 547 U (51) Int. Cl.  
*E06B 3/667* (2006.01)  
*F16B 7/04* (2006.01)

(52) U.S. Cl.  
CPC ............ *E06B 3/667* (2013.01); *F16B 7/0413* (2013.01); *Y10T 403/559* (2015.01)

(58) Field of Classification Search  
CPC ...... E04B 1/5818; E06B 3/667; E06B 3/6675; F16B 7/0413; F16B 7/042; Y10T 403/55;  
(Continued)

(56) References Cited

U.S. PATENT DOCUMENTS 8,109,689 B2 * 2/2012 Kronenberg ............ E06B 3/667  
                     403/298  
8,297,871 B2 * 10/2012 Kronenberg ............ E06B 3/667  
                     403/292  
(Continued)

FOREIGN PATENT DOCUMENTS

DE     9216955 U1 * 4/1994 ............ E06B 3/667  
DE    201 01 486 U1   7/2002  
(Continued)

OTHER PUBLICATIONS

Specification Translation of DE 202010008633. Kronenberg. Connectors. Dec. 8, 2011.*

(Continued)

*Primary Examiner* — Josh Skroupa  
(74) *Attorney, Agent, or Firm* — McGlew and Tuttle, P.C.

(57) ABSTRACT

A plug connector (1) and a plug connection (2), for hollow profiled sections (3, 4) of spacers of an insulating glazing, has a base (8) with edge-side lateral walls (10), a central stop (21), and retaining elements (16). The plug connector (1) is formed of a temperature-resistant material, in particular metal, at least in the region of the connector center (20) and is suitable for a welding connection (5) of the hollow profiled sections (3, 4). The plug connector has a shape which is rigid against external transverse loads at least in the central region and a substantially U-shaped cross-section with a hammerhead shape and lateral walls (10), which are recessed in steps (11) in the upper region (12). The lateral walls (10) have a supporting and retaining structure (15), which is oriented towards the roof (27) of the hollow profiled sections (3, 4), at the upper free edge (14).

20 Claims, 7 Drawing Sheets

(58) Field of Classification Search
CPC ........... Y10T 403/559; Y10T 403/5741; Y10T 403/5793
USPC ............ 403/298, 306, 314, 292; 52/204.595, 52/204.71, 655.1, 715, 786.13, 848
See application file for complete search history.

(56) References Cited

U.S. PATENT DOCUMENTS

| | | | | |
|---|---|---|---|---|
| 8,615,961 | B2 * | 12/2013 | Kronenberg | ............ E06B 3/667 403/292 |
| 10,316,876 | B2 * | 6/2019 | Huwer | .................. F16B 7/0413 |
| 2002/0102127 | A1 | 8/2002 | Loh | |
| 2011/0203198 | A1 | 8/2011 | Kronenberg et al. | |

FOREIGN PATENT DOCUMENTS

| | | | |
|---|---|---|---|
| DE | 20 2004 004 933 U1 | 7/2005 | |
| DE | 20 2005 004 601 U1 | 2/2006 | |
| DE | 20 2006 006 087 U1 | 10/2007 | |
| DE | 20 2006 018 811 U1 | 11/2007 | |
| DE | 20 2008 013 046 U1 | 2/2010 | |
| DE | 20 2009 008 694 U1 | 11/2010 | |
| DE | 20 2010 008 633 U1 | 10/2011 | |
| DE | 10 2011 055 539 A1 | 5/2013 | |
| DE | 202014104222 U1 * | 12/2015 | ............. E06B 3/667 |
| DE | 202017101315 U1 * | 6/2018 | ............. E06B 3/667 |
| EP | 0 283 689 A2 | 9/1988 | |
| EP | 1785575 A2 * | 5/2007 | ............. E06B 3/667 |
| EP | 2397641 A2 * | 12/2011 | ............. E06B 3/667 |

OTHER PUBLICATIONS

Specification Translation of DE102011055539. Rafeld-Cech. Connector for connecting hollow profiles, particularly spacer hollow profiles of insulating glass panes, has base part and longitudinal bars upstanding from base part, where plug connector is formed as straight- or cross-connector. May 23, 2013.*

* cited by examiner

PLUG CONNECTOR AND PLUG CONNECTION

CROSS REFERENCE TO RELATED APPLICATIONS

This application is a United States National Phase Application of International Application PCT/EP2015/077048, filed Nov. 19, 2015, and claims the benefit of priority under 35 U.S.C. § 119 of German Application 20 2014 105 547.9, filed Nov. 19, 2014, the entire contents of which are incorporated herein by reference.

FIELD OF THE INVENTION

The present invention pertains to a plug connector and to a plug connection for hollow profiled sections of spacers of an insulating glazing, the plug connector having a base with edge-side lateral walls as well as a central stop and retaining elements.

BACKGROUND OF THE INVENTION

Connecting spacer hollow profiled sections for insulating glass panes by means of plug connectors, wherein the plug connectors dig into the interior of the profiled section with retaining elements and ensure the holding together of the assembled profiled section ends by means of frictional connection and positive locking is known in practice.

SUMMARY OF THE INVENTION

An object of the present invention is to provide an improved plug connection technology.

The connection technology according to the invention, i.e., the plug connector and the plug connection established with it as well as the corresponding method, have the advantage of high safety and high mechanical stability of the plug connection due to the thermal connection, especially welded connection or weld seam. The plug connector according to the invention is especially suitable and configured for such a plug connection.

Especially, thermal loads acting from the outside can be absorbed by the plug connector especially well and without losses of operability of the plug connector. The plug connector is especially suitable for the external mechanical loads acting during the connection process as well. The plug connector may, in addition, effectively support the hollow profiled section ends from the inside and ensure a shape and dimensional accuracy of the hollow profiled sections and their ends before and after the connection process. Possible warping of profiled sections can be prevented. In addition, the heat acting during the connection process is also dissipated quickly via the plug connector.

The plug connector according to the invention is mechanically highly stable due to its mostly solid wall configuration and ensures a safe guiding and alignment of the hollow profiled section ends attached on both sides. The plug connector can hold together the hollow profiled section ends in the butt joint location and the butt joint position thereof during the thermal connection process, especially welding process. The plug connector according to the invention may also be used without thermal connection.

It is particularly advantageous in this case when the plug connector has a supporting and retaining structure at the upper free edge of its lateral walls. The plug connector may otherwise be in contact in a supporting and guiding manner with its lateral and base walls mostly flatly on the insides of the hollow profiled section walls. Additional retaining elements may possibly be arranged at the base. In addition, the arrangement of a central stop at the same upper lateral wall edge is advantageous.

The supporting and guiding structure is preferably directed against the roof of the hollow profiled section ends, which roof points to the external pane edge in the installed position in an insulating glass pane. As a result of this, the lateral walls and the roof are stabilized and their shape is secured, so that the individual glass panes of the insulating glazing can lie flatly and tightly on the hollow profiled section or sections. In addition, a preferred and possibly local thermal connection point can be stabilized.

An outwardly directed bulge at the lateral walls may have a different configuration and may have a variety of functions. A configuration as, e.g., a bead or as a free-cut protuberance, is possible. The bulge can absorb lateral dimensional tolerances of the hollow profiled end. It may further be used for improved sealing. In addition, it may improve the stability of the plug connector, especially in the form of an arrangement of one or more beads. The connector configuration according to the invention with a bulge has independent inventive significance and may advantageously also be used in other prior-art plug connectors. In one embodiment, such a preferably straight plug connector for hollow profiled sections of spacers of an insulating glazing may have a central web or base with edge-side lateral walls as well as a central stop and retaining elements and have an outwardly directed bulge, and especially a protuberance, at the lateral walls in the area of the connector center.

The present invention is shown schematically and with examples in the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Referring to the drawings, the present invention pertains to a plug connector (1) for hollow profiled sections (3, 4) of spacers of an insulating glazing. The present invention further pertains to a plug connection (2) established by the hollow profiled sections or hollow profiled section ends (3, 4) and the inserted plug connector (1) as well as a corresponding method for connecting hollow profiled sections or hollow profiled section ends (3, 4).

The hollow profiled sections (3, 4) connected to one another form a spacer framework extending at the pane edge, which spacer framework spaces apart the laterally flatly placed glass panes of an insulating glazing from one another, wherein a tight pane inner space is formed, in which an inert gas may be located. A granulated desiccant may be located in the spacer framework.

The hollow profiled sections (3, 4) shown consist of metal, e.g., steel, especially high-grade steel, or a light metal, in at least some areas. They may be configured, e.g., as rolled or drawn metallic profiled sections or as extruded profiled sections. As an alternative, the hollow profiled sections (3, 4) may consist of another material suitable for thermal connections. They may further consist of metal and plastic or other thermally suitable materials as composite profiled sections.

The spacer framework may be produced from one or more hollow profiled sections (3, 4). In case of a one-piece configuration, a single hollow profiled section is bent a number of times for forming corner areas, wherein its hollow profiled section ends (3, 4) preferably come to lie in a straight area of a framework and are connected to one another here by the inserted plug connector (1) as well as by a thermal connection (5). As an alternative, a plurality of individual hollow profiled sections may be connected to one another, wherein here as well the hollow profiled section ends (3, 4) are attached to the plug connector (1) on both sides and are connected by said thermal connection (5) at the butt joint or connection point (6).

Figure 6:
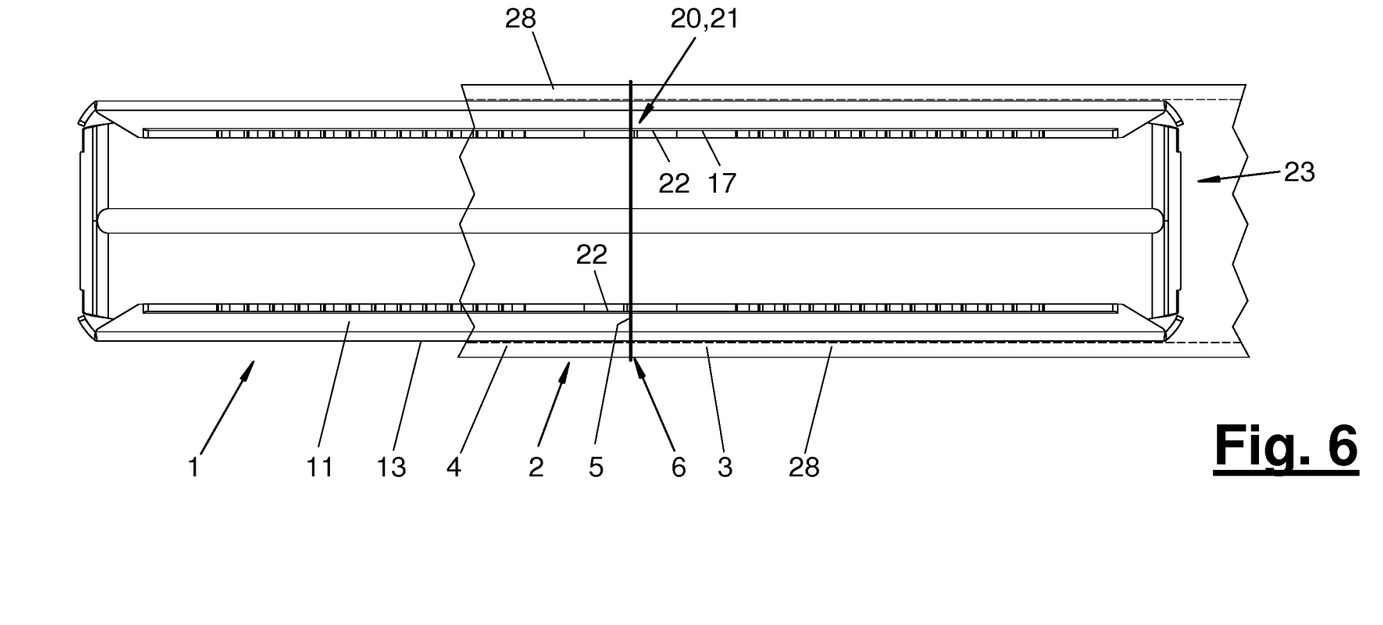
FIG. 6 is a top view showing a plug connection with plug connector and one or more hollow profiled sections.
Figures 17, 18:
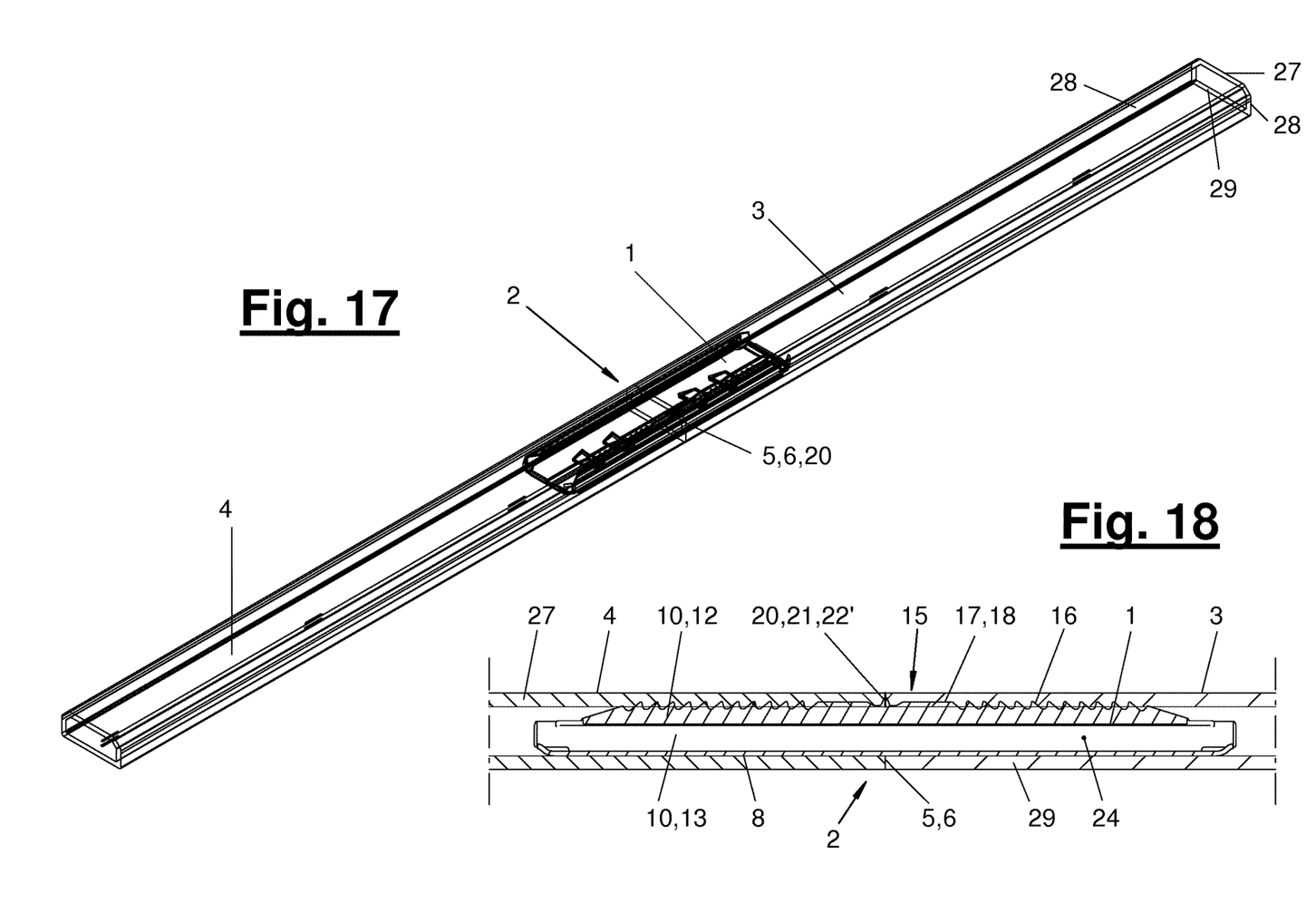
FIG. 17 is a perspective view showing a plug connection with the variant of the plug connector of FIG. 16.
FIG. 18 is a sectional view showing a plug connection with the variant of the plug connector of FIG. 16.

The preferably straight, cut-off front walls of the hollow profiled section ends (3, 4) abut each other in a sealed and preferably gap-free manner at the butt joint (6). They are permanently and tightly connected to one another here by the thermal connection (5). The thermal connection may be a welded connection, especially a weld seam arranged in some areas or extending at the outer profiled section circumference. FIGS. 6, 17 and 18 show this thermal connection (5).

FIGS. 1 through 7 show a first embodiment of the plug connector (1). It is configured as a straight connector in the exemplary embodiments being shown. As an alternative, it may be configured as a corner angle. The plug connector (1) has a base (8) with edge-side lateral walls (10) as well as a central stop (21) and retaining elements (16).

The plug connector (1) has a temperature-resistant material at least in the area of the connector center (20) or the butt joint (6) there and has a configuration suitable for a thermal connection (5) of the hollow profiled sections (3, 4). The temperature-resistant material preferably consists of metal, especially steel. In the exemplary embodiments shown, the plug connector (1) is manufactured as a punched and bent part from a possibly pretreated sheet steel, especially a galvanized sheet steel. As an alternative, the plug connector may be configured as a metallic cast part or as a composite part, wherein the composite part may have metal and may otherwise consist of a different material only in some areas, especially about the area of the connector center (20). The temperature-resistant material may consist of another suitable, nonmetallic material in another variant.

The plug connector (1) has a shape which is rigid against external transverse loads at least in the central area. The plug connector thereby supports the hollow profiled section ends (3, 4) attached on both sides from the inside against transverse loads acting from the outside during the manufacturing process or connection process, especially during the formation of the thermal connection (5). These transverse loads may be forces and/or torques.

The straight connector (1) being shown has an elongated shape with a longitudinal axis (7) and a transverse central line (20). On both sides of the center (20), the plug connector (1) has straight and flush connector legs, which are preferably open at their free connector ends (23). Here, they may have obliquely inwardly protruding lateral tongues (26) at the front ends of the side walls (10) and possibly also a base tongue (25), which facilitate the attachment of the respective hollow profiled section end (3, 4).

Figure 1:
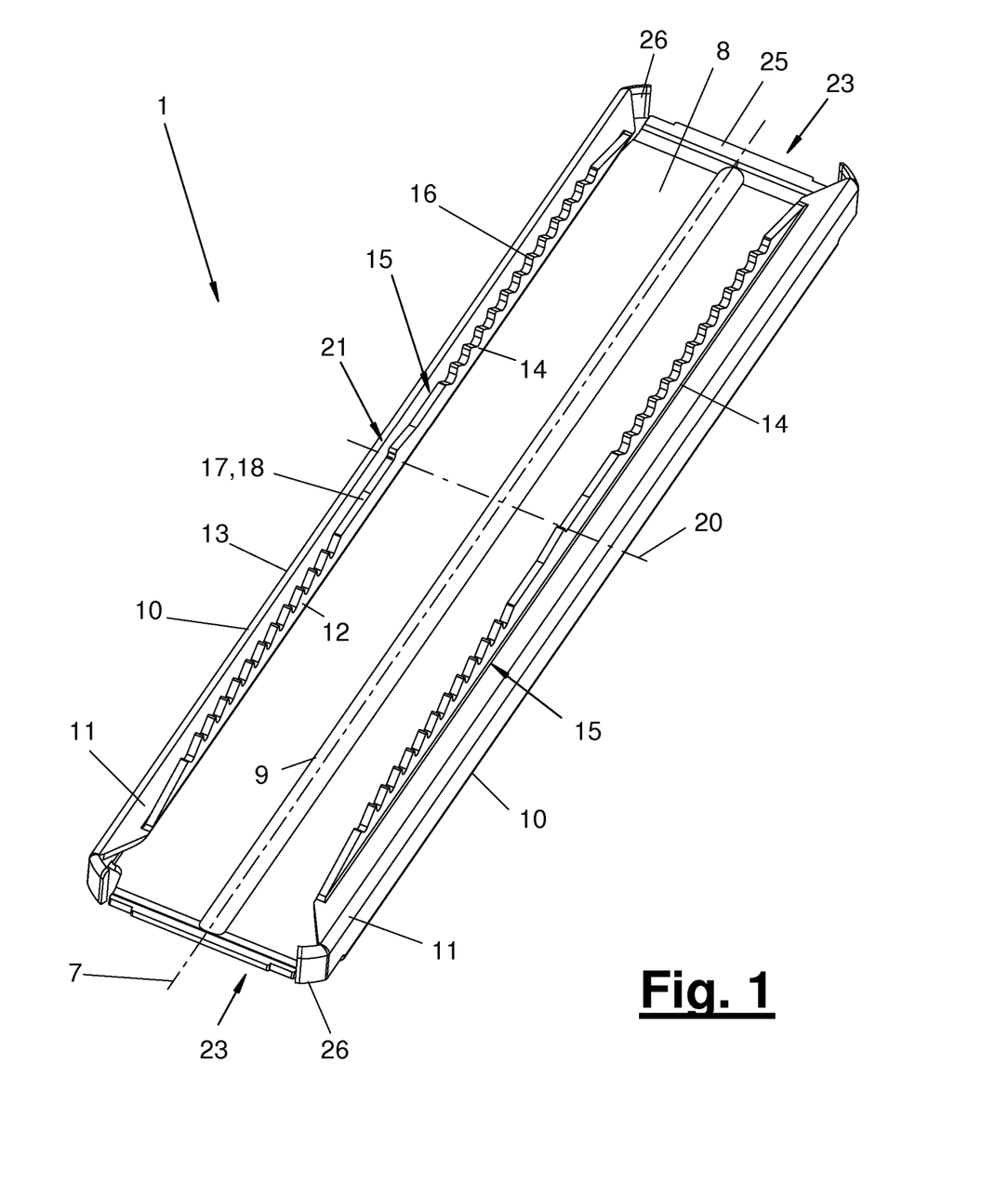
FIG. 1 is a perspective view showing a plug connector.
Figure 2:
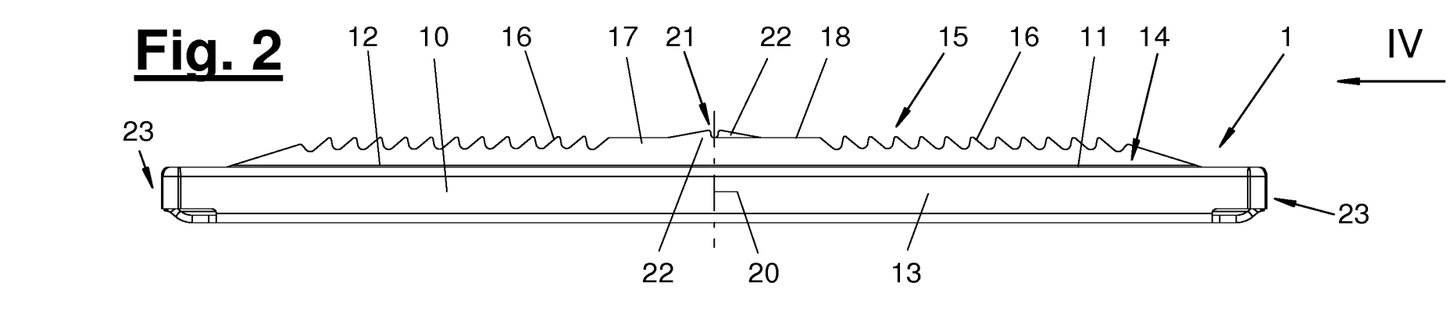
FIG. 2 is a lateral view showing the plug connector of FIG. 1.
Figures 3, 4:
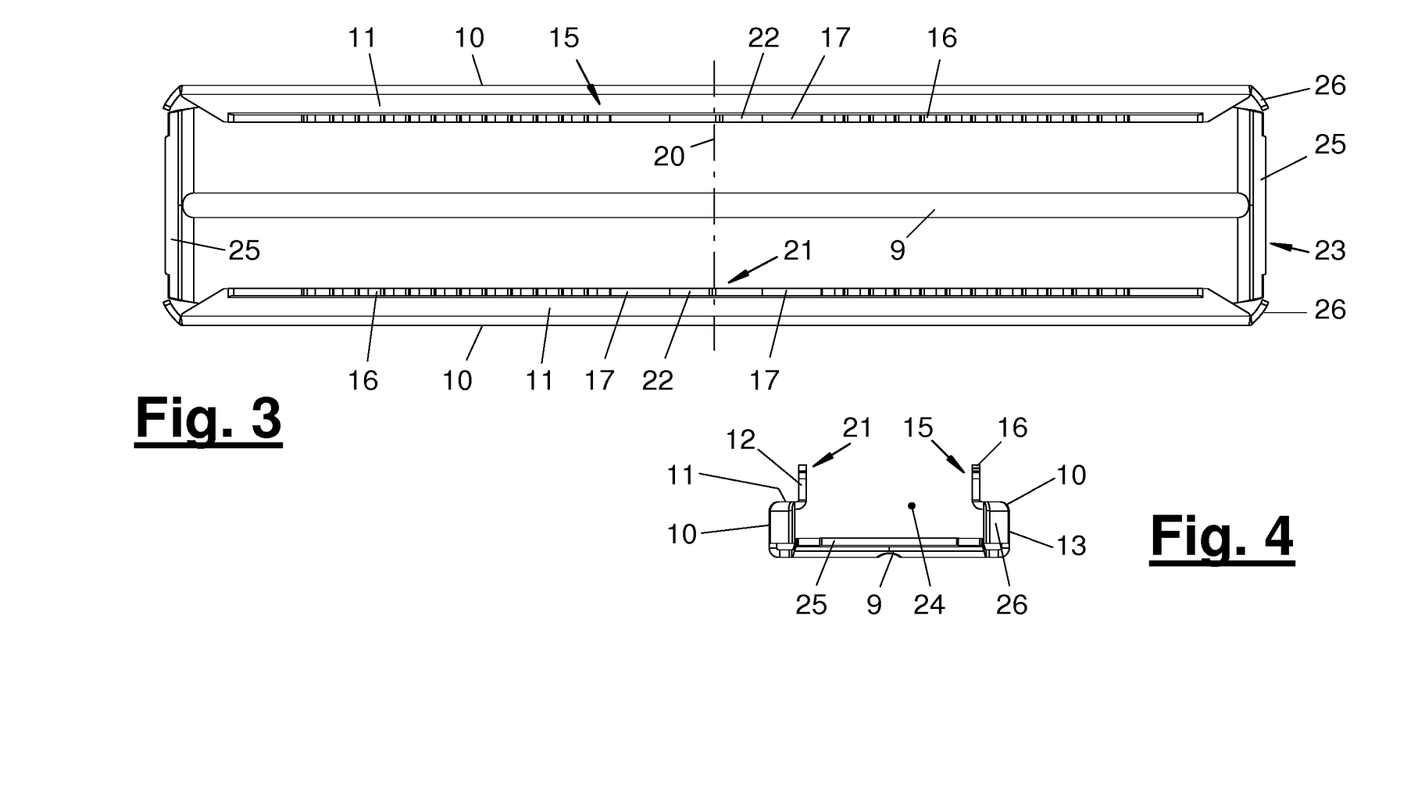
FIG. 3 is a top view showing the plug connector of FIG. 1.
FIG. 4 is a front view showing the plug connector of FIG. 1 according to arrow IV of FIG. 2.
Figure 7:
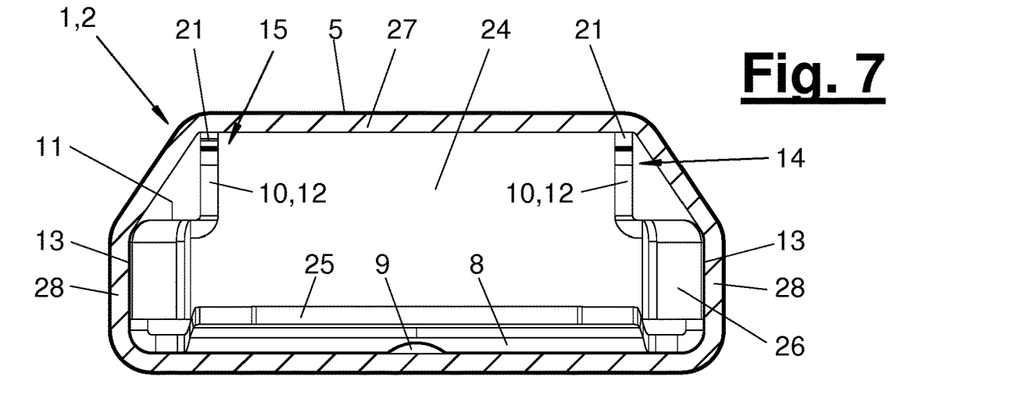
FIG. 7 is a front view showing a plug connection with plug connector and one or more hollow profiled sections.

The plug connector (1) has an essentially U-shaped cross section with lateral walls (10) recessed in steps (11) in the upper area (12) towards the inside of the connector. As FIGS. 4 and 7 illustrate in the respective front views, the plug connector (1) in the preferred embodiment has a hammerhead shape or omega shape, wherein the lateral walls (10) have an angular cross-sectional shape, forming a step (11). The lower lateral wall area (13), which is adjacent to the longitudinal edge of the base (8), has a leg which is aligned vertically or at right angles to the principal plane of the base, which subsequently passes over to the formation of steps (11) in a recessed transverse leg, which is preferably aligned essentially parallel to the principal plane of the base. The upper lateral wall area (12) which is adjacent to the transverse leg extends again vertically or upwards and is aligned essentially at right angles to the principal plane of the base.

The upper and the lower lateral wall areas (12, 13) have an essentially planar shape or surface and they are aligned essentially parallel. The upper lateral wall area (12) is arranged offset against the lower lateral wall area (13) in a direction towards the central longitudinal axis (7). The step (11) or the transverse leg likewise has a planar configuration. The base (8) and the lateral walls (10) are configured as thin-walled webs. The stepped lateral wall shape may be produced, e.g., by means of bending and beveling. The plug connector (1) has a preferably one-piece configuration in the embodiments being shown.

Figure 5:
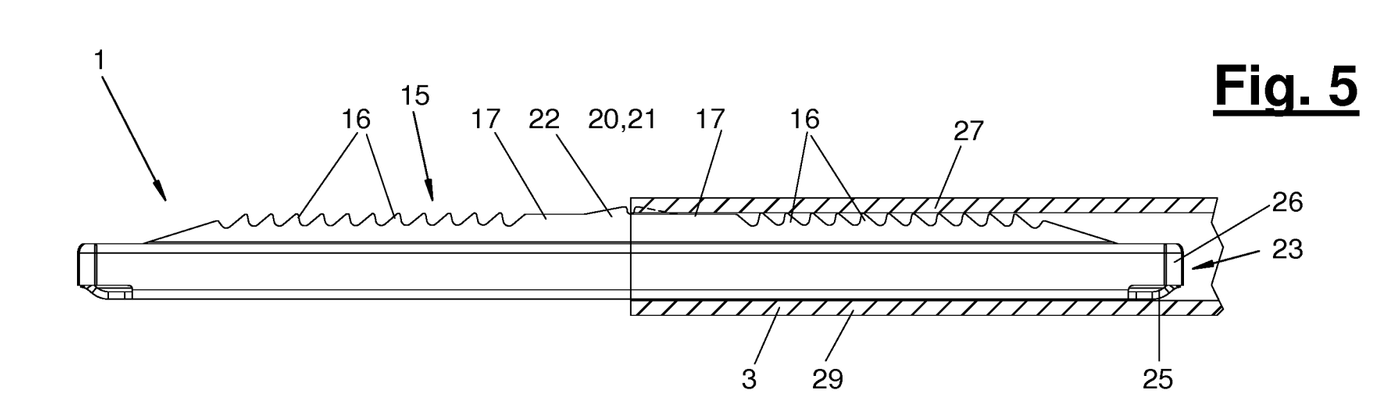
FIG. 5 is a lateral view showing a plug connection with plug connector and one or more hollow profiled sections.
Figure 16:
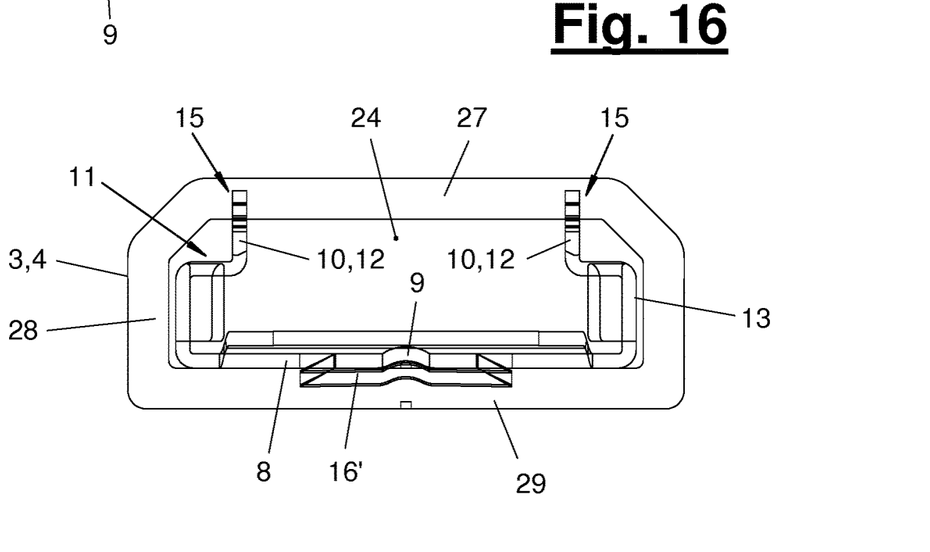
FIG. 16 is a view showing a plug connection with the variant of the plug connector.

FIGS. 5 through 7 as well as FIGS. 16 through 18 show the configuration of the hollow profiled sections (3, 4) and of the hollow profiled section ends. These have a base (29), which is directed towards the pane inner space. They further have vertical lateral walls (28) and a roof (27) directed towards the outer side of the framework. The junction between the lateral walls (28) and the roof (27) can be beveled according to FIG. 7. As an alternative, the junction may have a rectangular configuration. Further, the hollow profiled sections (3, 4) may also have a hammerhead or omega shape.

The lateral walls (10) of the plug connector (1) have a supporting and retaining structure (15) which is directed against the roof (27) at the upper free edge (14). In addition, the central stop (21) is preferably arranged in the area of the center (20) at this upper free edge (14). The lateral walls (10) are preferably configured as solid and uninterrupted in the area below the supporting and retaining structure (15). As a result and due to their angular shape, they have a high mechanical strength.

In the embodiment of FIGS. 1 through 7, the lateral walls (10) have a straight shape in a direction towards the longitudinal axis (7). This straight shape extends continuously over the essential part of the connector length up to the lateral tongues (26) that are possibly present. This also has an effect on the stability of the plug connector (1) and the plug connection (2) as well as on the retention and guiding of the plug connector (1) in the hollow profiled section ends (3, 4).

With their lower wall or web area (13), the lateral walls (10) are preferably flatly in contact with the respective lateral wall (28) of the hollow profiled section ends (3, 4), which lateral wall (28) is likewise preferably planar here. The height of these two wall areas is preferably the same, wherein the bending point between the lower wall area (13) and the step (11) is located, e.g., at the same height as the bending of the lateral wall (28) and supports this bending. The upper lateral wall areas (12) and the supporting and retaining structure (15) there are in contact with the roof (27), wherein they are preferably located in the vicinity of the junction point between the roof (27) and the oblique part of the lateral wall (28). The lateral recess or the step (11) has a corresponding depth for this.

The supporting and retaining structure (15) of the lateral walls (10) has on both sides of the central stop (21) and of the central line (20) a support strip (17) each with a straight axial upper edge (18). Here, the roof (27) can be supported at the butt joint (6) or the weld seam (5).

The supports strips (17) have a limited length on both sides of the center. Further, the supporting and retaining structure (15) has a plurality of retaining elements (16), which are connected to the support strips (17) in the axial direction and in the direction towards the adjacent connector ends (23). The retaining elements (16) are preferably arranged in the principal plane of the upper lateral wall area (12) and directed upwards towards the roof (27). They may end at a distance in front of the respective connector end (23), wherein the lateral wall drops off obliquely towards the connector end (23) and facilitates the pushing on of the hollow profiled section ends (3, 4). The upper ends of the retaining elements (16) may be arranged at the level of the support strips (17) or somewhat above them.

The retaining elements (16) are configured, e.g., as teeth. In this case, they may have a sawtooth shape, which is directed towards the connector center (20) at each of the connector legs. The flatter tooth flank points to each connector end (23) and the steeper flank points towards the connector center (20). The sawtooth shape facilitates the attachment of the hollow profiled section ends (3, 4) and with its gripping tip blocks the drawing motion in the opposite direction. As an alternative, the retaining elements (16) may be configured in a different way, e.g., as ribs or shafts or even as spring lugs.

The central stop (21) may have a different configuration. In the exemplary embodiments of FIGS. 1 through 11 shown, it has wedge-shaped stop lugs (22), which are fixed and offset to one another. Only one stop lug (22) each is arranged at the free edges (14), the two stop lugs (22) being located on both sides of the connector center (20) and being directed against one another. The stop lugs (22) have each a steeply rising stop flank, which is directed towards the connection center (20) and a less steeply rising leading edge directed towards the adjacent connector end (23). The latter leading edge passes into said upper edge (18) of the support strip (17).

The attached hollow profiled section ends (3, 4) can slide upon the leading edge, wherein they stop on the other side beyond the longitudinal axis at the rigid stop flank of the other stop lug (22) or at the end face of the other hollow profiled section end (4, 3) possibly already located there. As a result, a gap-free butt joint (6) with tight contact of the profiled section front walls can be formed.

FIGS. 12 through 15 show a variant of the central stop (21), which will be explained below. As an alternative, the central stop (21) may still be configured in a different way. It may, e.g., also be formed by spring lugs, which are arranged in pairs on both sides of the center (20) at one or both of the lateral walls (10).

The base (8) preferably has mostly planar outer areas for the planar contact at the hollow profiled section base (29). In case one or more passages or rows of perforations are located at the hollow profiled section base (29), the connector base (8) may have an axial and groove-shaped recess (9) in this area and overlap the row of perforations. In the exemplary embodiments of FIGS. 1 through 11, the base (8) has a closed shape.

The plug connector (1) has said preferably open end faces (23) and an inner cavity (24), which is continuous over its length and through which the granulated desiccant can flow over the butt joint (6). The passages or rows of perforations establish a connection to the gas located in the pane inner space and make it possible to keep same dry.

FIGS. 5 through 6 as well as FIGS. 16 through 18 show the plug connection (2) mentioned in the introduction with a plug connector (1) and the hollow profiled section ends (3, 4) attached on one side or on both sides as well as the thermal connection (5), especially weld seam.

The plug connection (2) is established, for example, by the plug connector (1) first being inserted into the one hollow profiled section end (3) with the one connector leg and then the other hollow profiled section end (4) being pushed onto the other free connector leg. As a result, a mechanically active plug connection (2) is first established.

Subsequently, the thermal connection (5) can be formed. For this, the front wall areas of the hollow profiled section ends (3, 4), which front wall areas abut against one another, are preferably heated from the outside and plasticized, e.g., by a laser welding device or another manual or automatic device, and they are connected to one another and possibly to the parts of the plug connector (1) located there. The connection operation may be, e.g., a fusing together or bonding. The thermal connection (5) or the connection seam may extend over the entire circumference of the hollow profiled section ends (3, 4) and possibly of the plug connector (1) at the connection point (6). As an alternative, the thermal connection (5) or connection seam may be present only at a partial area, e.g., at the roof area (27) and the oblique areas of the lateral walls (28) of the hollow profiled section ends (3, 4).

FIGS. 8 through 11 illustrate embodiment variants of the plug connector (1), in which the lateral walls (10) have an outwardly directed bulge (19). This bulge may have a different configuration.

Figure 8:
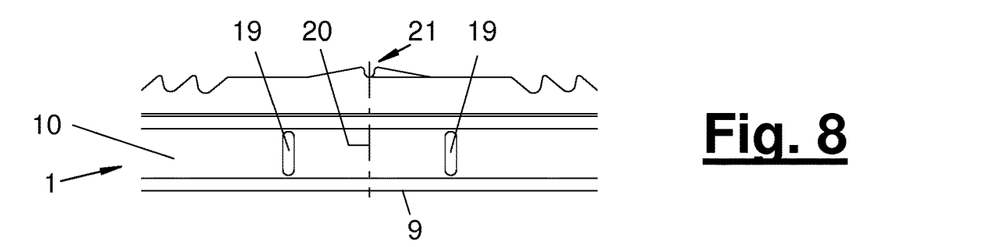
FIG. 8 is a broken-off lateral view showing a plug connector with a lateral bulge in one of two variants.
Figure 9:
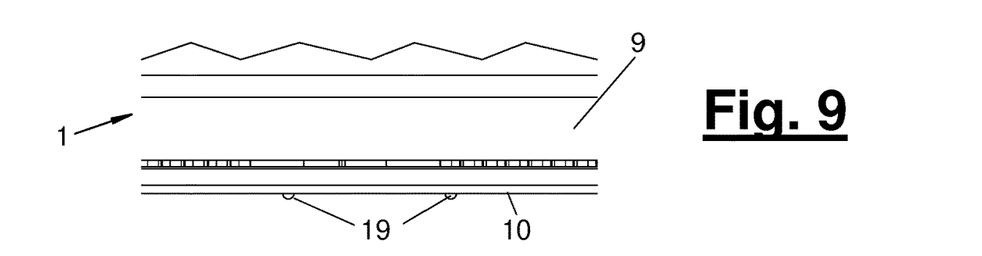
FIG. 9 is a broken-off top view showing the plug connector with the lateral bulge in one of the two variants.

In the first variant of the lateral view of FIG. 8 and of the corresponding broken-off top view of FIG. 9, the bulge (19) is configured as a bead, which is arched outwardly laterally from the lateral wall (10), e.g., from the lower lateral wall area (13) thereof. In the embodiment shown, two bead-like bulges (19), which are rod-shaped and are aligned at right angles to the base (8), are present on both sides of the center (20). As an alternative, the number of beads may be smaller or larger. A single bead-like bulge (19) may extend, e.g., beyond the center (20).

Figure 10:
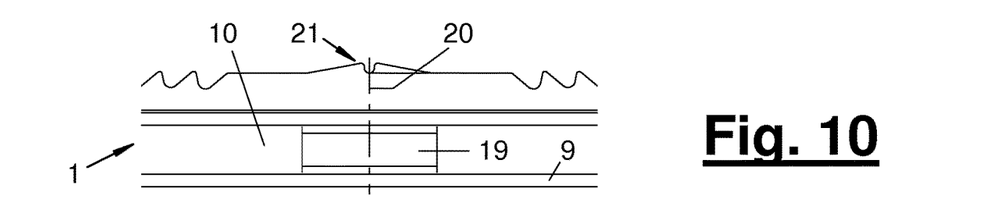
FIG. 10 is a broken-off lateral view showing a plug connector with a lateral bulge in another of two variants.
Figure 11:
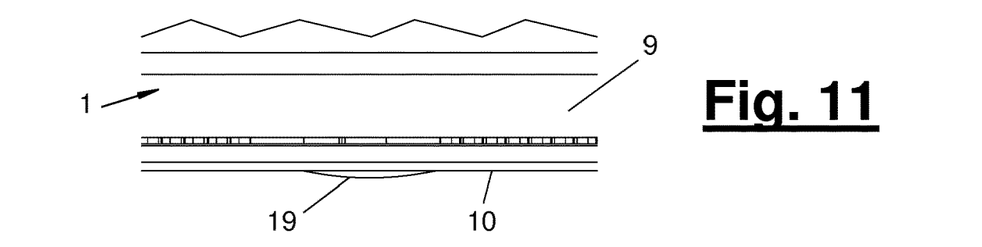
FIG. 11 is a broken-off top view showing the plug connector with the lateral bulge in another of the two variants.
Figure 12:
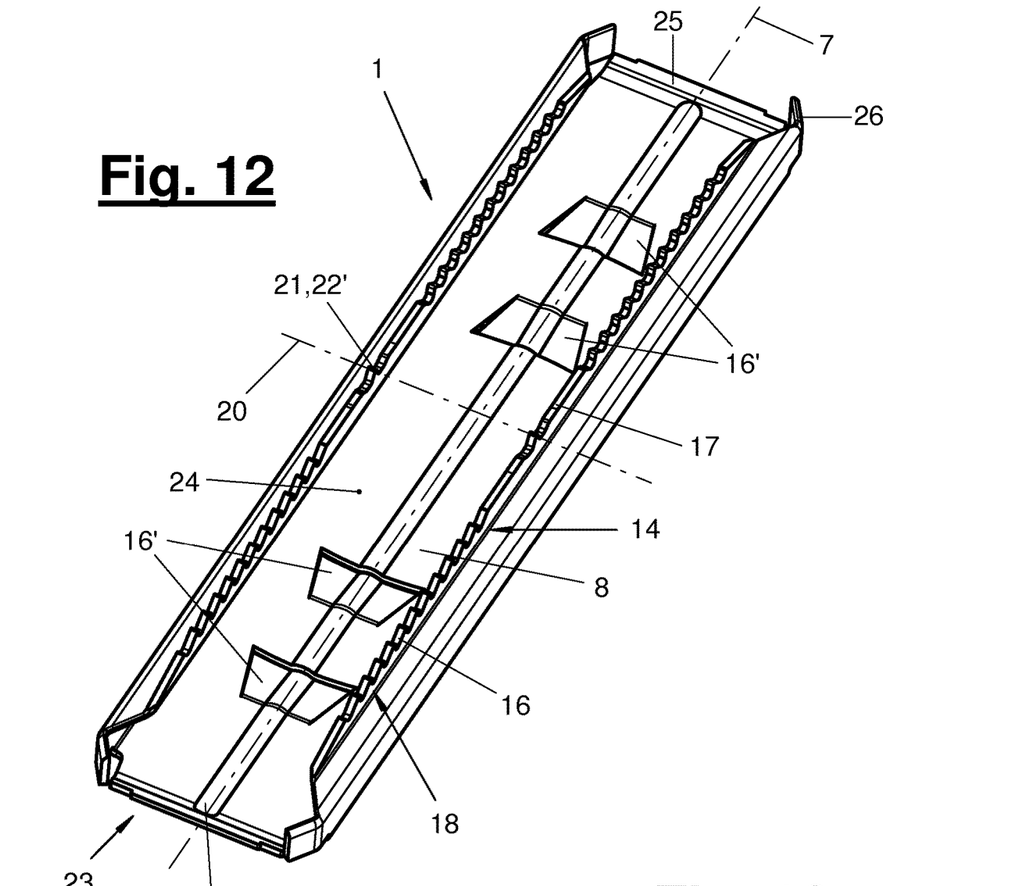
FIG. 12 is a perspective view of a variant of the plug connector.
Figure 13:
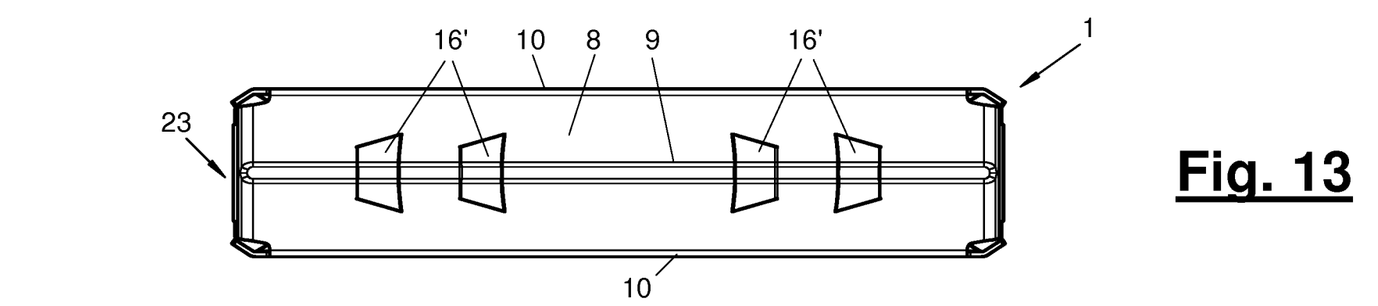
FIG. 13 is a bottom view of a variant of the plug connector of FIG. 12.
Figure 14:
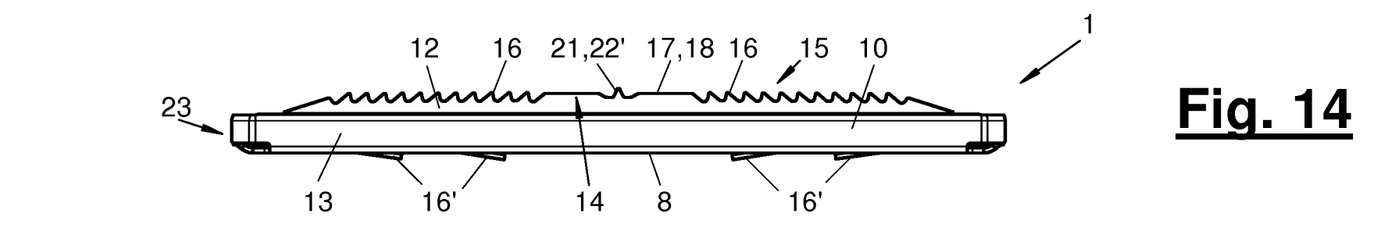
FIG. 14 is a side view of a variant of the plug connector of FIG. 12.
Figure 15:
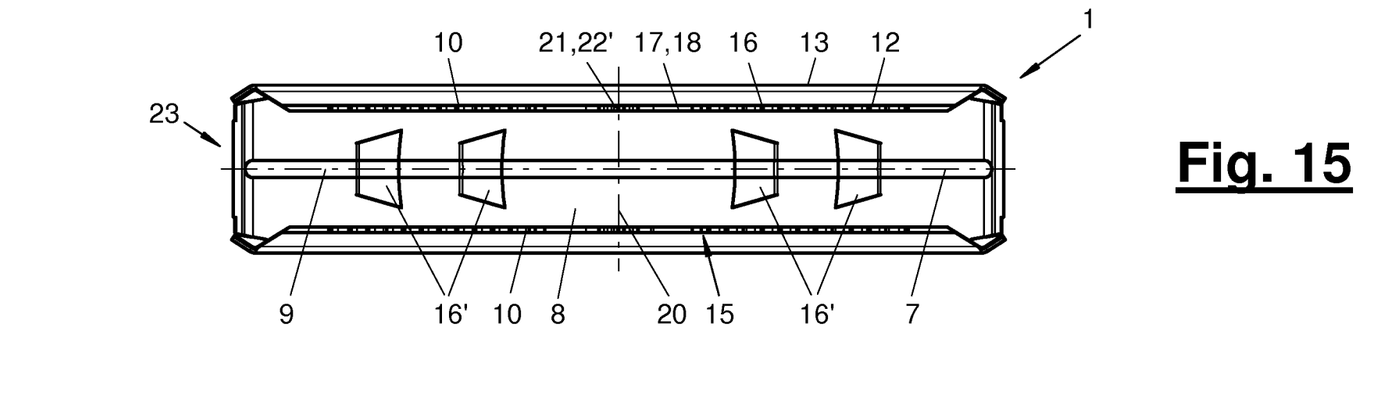
FIG. 15 is a top view of a variant of the plug connector of FIG. 12.

In the second variant with the lateral view of FIG. 10 and the corresponding broken-off top view of FIG. 11, the bulge (19) is configured as a free-cut protuberance, in which a lateral wall area, which is free cut or otherwise released in the axial direction, is arched outwardly. The protuberance (19) extends beyond the center (20) and has a greater axial extension.

The one or more bulges (19) are located at those lateral wall areas, which reach the inserted position in contact with a facing inner wall area of the attached hollow profiled section end (3, 4). These are the lower lateral wall areas (13) in the exemplary embodiments shown.

The bulges (19) according to the present invention have independent inventive significance and may also be used in other conventional plug connectors that have a different configuration and possibly do not have the above-described configuration and suitability for a thermal connection (5). These may be, e.g., plug connectors that have a U-shaped or box-like cross section, which are configured, e.g., according to DE 20 2009 008 694 U1 or EP 0 283 689 A2. Such plug connectors may consist of metal, especially of sheet steel or of plastic or of other suitable materials. They may have other central stops and other retaining elements, a plurality of which may possibly be present, e.g., spring lugs, slats or the like, which may further be arranged at another point of the lateral walls and/or at the connector base.

FIGS. 12 through 15 show another variant of the plug connector (1), which is largely in agreement with the above-described exemplary embodiments. The plug connector (1) shown likewise has an essentially U-like, hammerhead-shaped cross section. The plug connector has a base (8) and lateral walls or lateral webs (10) connected to both longitudinal edges thereof with said step (11) and the supporting and retaining structure (15) at the upper free lateral web edge (14). A lateral bulge or protuberance (19) is missing in this variant, but may be present, as an alternative. In this variant, the plug connector (1) shown likewise has open end faces (23) and a continuous cavity (24).

One difference of the variant shown compared to the first exemplary embodiment is the retaining technology and the configuration of the base (8). One or more additional retaining elements (16'), which act against the base (29) of the hollow profiled section ends (3, 4), are arranged at the base (8). The retaining elements (16') are configured, e.g., as resilient base lugs, which are directed obliquely outward and free cut as well as bent away from the base (8). These retaining elements (16') are arranged centrally and, e.g., in pairs on both sides of the connector center (20), as well as tilted obliquely towards the connector center (20). During the attachment of a hollow profiled section end (3, 4), they are crossed and pushed back in a resilient manner, wherein they become wedged or dig in at the profiled section base (29) with their free and, e.g., sharped-edged edges and together with the upper retaining elements (16) prevent a pulling off of the applied hollow profiled section end (3, 4). FIGS. 16 and 17 illustrate this in the plug connection (2) shown.

Another difference compared to the first exemplary embodiment is the configuration of the central stop (21). This central stop (21) is formed by two small rigid stop lugs (22') in the variant of FIGS. 12 through 15, which stop lugs (22') are arranged centrally at the connector center (20) and at the upper edge (18) of both lateral walls (10). The stop lugs (22') protrude upwards and have a slim, wedge-shaped design. They form an active ministop on both sides, which digs into the end faces thereof during the attachment of the hollow profiled section ends (3, 4) and thereby makes possible a tight abutting of the profiled section end faces at the connection point (6). This is advantageous for the sealing of the spacer and also for a thermal connection (5). FIG. 17 shows this tight abutting.

Further, the plug connector (1) with the hammerhead shape described may also advantageously be used for conventional hollow profiled sections (3, 4) and plug connections (2) without a thermal connection (5). The central stop (21) shown as well as the supporting and retaining structure (15) and the solid and uninterrupted lateral wall formation below the supporting and retaining structure (15) also have advantages for a mechanical digging of the plug connector (1) into the hollow profiled section ends (3, 4) and the holding together brought about thereby.

A variety of modifications of the embodiments shown and preferred are possible. In particular, the features of the various exemplary embodiments may be combined with one another as desired and also possibly be interchanged. While specific embodiments of the invention have been shown and described in detail to illustrate the application of the principles of the invention, it will be understood that the invention may be embodied otherwise without departing from such principles.

The invention claimed is:

1. A plug connector for hollow profiled sections of spacers of an insulating glazing, the plug connector comprising:
    a base;
    edge-side lateral walls;
    a central stop; and
    retaining elements, the plug connector having a temperature-resistant material, comprising metal, at least in an area of a connector center and having a configuration suitable for a welded connection, of the hollow profiled sections and having a shape which is rigid against external transverse loads at least in the central area, the plug connector having an essentially U-shaped cross section wherein:
    the edge-side lateral walls are each recessed in with each edge-side lateral wall having a step between an upper lateral wall area and a lower lateral wall area and with the upper lateral wall area arranged offset relative to the lower lateral wall area in a direction towards a central longitudinal axis of the plug connector;
    the step between each upper lateral wall area and lower lateral wall area has an essentially rectangular configuration;
    the edge-side lateral walls, at an upper free edge thereof, have a supporting and retaining structure directed towards a roof of the hollow profiled sections;

the edge-side lateral walls, below the supporting and retaining structure are configured as solid and uninterrupted over a length thereof;

the central stop is arranged at the upper free edge of the edge-side lateral walls; and the supporting and retaining structure has a support strip with a straight axial upper edge on both sides of the central stop.

2. A plug connector in accordance with claim 1, wherein the base and the edge-side lateral walls are configured as webs.

3. A plug connector in accordance with claim 1, wherein the upper and lower side wall areas have an essentially planar shape.

4. A plug connector in accordance with claim 1, wherein the upper and lower side wall areas are aligned essentially parallel.

5. A plug connector in accordance with claim 1, wherein the upper side wall area is aligned essentially at right angles to the base.

6. A plug connector in accordance with claim 1, wherein the edge-side lateral walls have a straight shape in a direction of a longitudinal axis of the plug connector.

7. A plug connector in accordance with claim 1, wherein the supporting and retaining structure has a plurality of retaining elements comprising teeth, on both sides of the central stop and of the support strips.

8. A plug connector in accordance with claim 1, wherein the central stop has wedge-shaped stop lugs, which are fixed and offset to one another, or central stop lugs, which are rigid or act as ministops on both sides, at the free edges.

9. A plug connector in accordance with claim 1, wherein a stop lug each is arranged at the free edges, wherein the stop lugs are arranged on both sides of the connector center and are directed towards one another.

10. A plug connector in accordance with claim 1, wherein the stop lugs have a steeply rising stop flank, which is directed towards the connector center, and a less steeply rising leading edge, which is directed towards an adjacent connector end.

11. A plug connector in accordance with claim 1, wherein the plug connector is configured as a straight connector.

12. A plug connector in accordance with claim 1, wherein the plug connector has a bulge protuberance, which is directed outwards, at the lateral walls in the area of the connector center.

13. A plug connector in accordance with claim 12, wherein the bulge is configured as a bead, which is arched outwardly laterally from the lower lateral wall area.

14. A plug connector in accordance with claim 13, wherein two bead bulges, which are rod-shaped and are aligned at right angles to the base are present on both sides of the center.

15. A plug connector in accordance with claim 1, wherein the plug connector has open end faces and an inner cavity continuous over a length thereof.

16. A plug connector in accordance with claim 1, wherein the base has one or more axial, groove-shaped recesses on an outside.

17. A plug connector in accordance with claim 1, wherein the base has a closed configuration or has additional retaining elements comprising resilient base lugs, which are free cut and bent obliquely outwards, on both sides of the center.

18. A plug connector in accordance with claim 1, wherein the plug connector is configured as a punched and bent part made of metal comprised of sheet steel.

19. A plug connection, consisting of hollow profiled section ends of spacers of an insulating glazing and a plug connector inserted there, the plug connector comprising:

a base;

edge-side lateral walls;

a central stop; and retaining elements, the plug connector having a temperature-resistant material, comprising metal, at least in an area of a connector center and having a configuration suitable for a welded connection, of the hollow profiled sections and having a shape which is rigid against external transverse loads at least in the central area, the plug connector having an essentially U-shaped cross section and wherein:

the edge-side lateral walls are each recessed with each edge-side lateral wall having a step between an upper lateral wall area and a lower lateral wall area and with the upper lateral wall area arranged offset relative to the lower lateral wall area in a direction towards a central longitudinal axis of the plug connector;

the step between each upper lateral wall area and lower lateral wall area has an essentially rectangular configuration;

the edge-side lateral walls, at an upper free edge thereof, have a supporting and retaining structure directed towards a roof of the hollow profiled sections;

the edge-side lateral walls, below the supporting and retaining structure are configured as solid and uninterrupted over a length thereof;

the central stop is arranged at the upper free edge of the side edge lateral walls; and the supporting and retaining structure has a support strip with a straight axial upper edge on both sides of the central stop.

20. A plug connection in accordance with claim 19, wherein the hollow profiled section ends have a thermal connection, comprising a welded connection, at a connection point of two adjacent said hollow profiled section ends, wherein the hollow profiled section ends have metal in at least some areas.

* * * * *